A. H. EMERY.
RAILROAD TRACK SCALE.
APPLICATION FILED DEC. 31, 1915.

1,213,605.

Patented Jan. 23, 1917.
3 SHEETS—SHEET 1.

Inventor,
Albert H. Emery,
By Knight Bro.
Attorneys.

A. H. EMERY.
RAILROAD TRACK SCALE.
APPLICATION FILED DEC. 31, 1915.

1,213,605.

Patented Jan. 23, 1917.
3 SHEETS—SHEET 3.

Inventor,
Albert H. Emery,
By Knight Bros
Attorneys.

UNITED STATES PATENT OFFICE.

ALBERT HAMILTON EMERY, OF STAMFORD, CONNECTICUT.

RAILROAD-TRACK SCALE.

1,213,605.

Specification of Letters Patent.   Patented Jan. 23, 1917.

Application filed December 31, 1915. Serial No. 69,666.

*To all whom it may concern:*

Be it known that I, ALBERT HAMILTON EMERY, a citizen of the United States, residing at Stamford, in the county of Fairfield and State of Connecticut, have invented certain new and useful Improvements in Railroad-Track Scales, of which the following is a specification.

My invention relates to plate-fulcrum scales in which it is desired to have a free connection between the load transmitting end of a lever and the load receiving fulcrum of the next lever, so that changing the length of the levers to change their rate of transmission or changes of length due to temperature changes, will not cause horizontal stresses between the transmitting fulcrums and the loading platforms on which they bear.

My invention is illustrated in the accompanying drawings, which form a part of this specification, in which—

Figure 1:
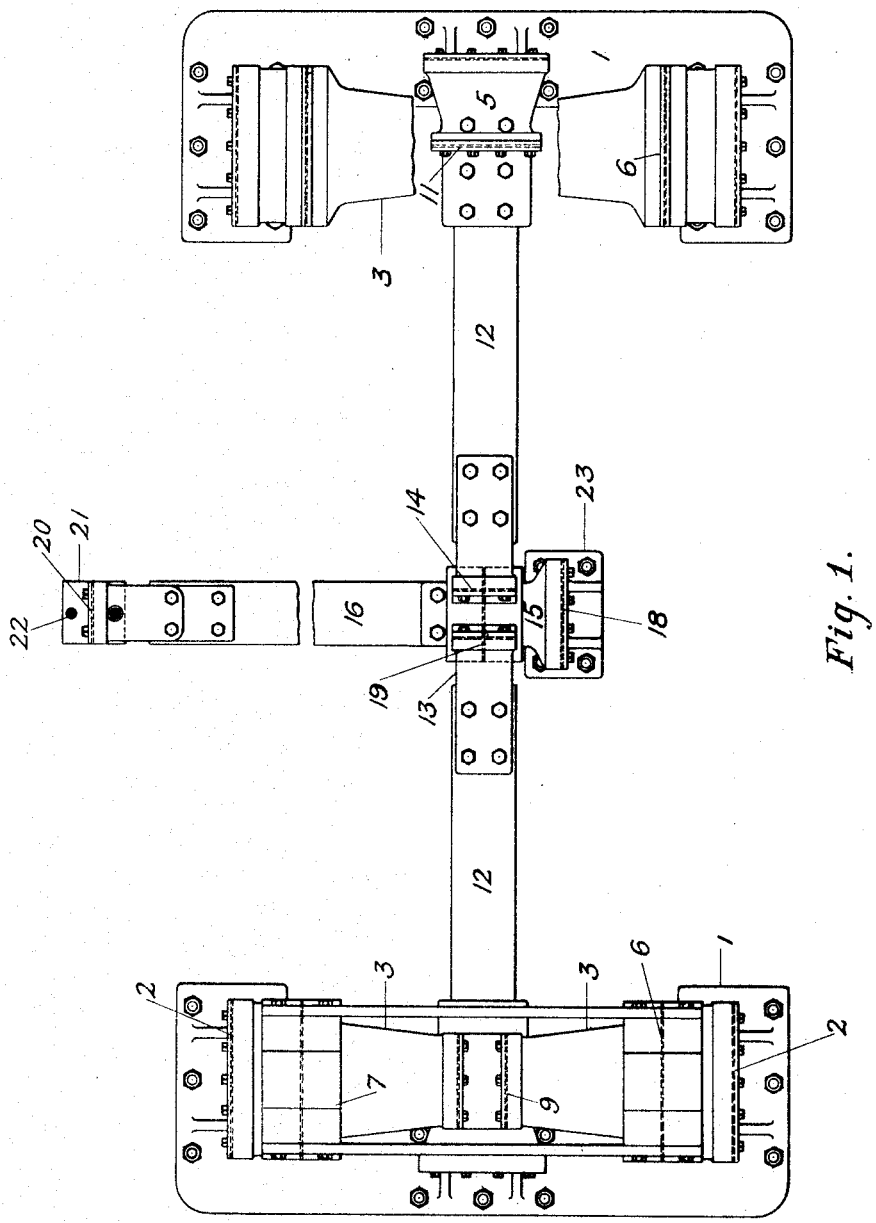
Figure 2:
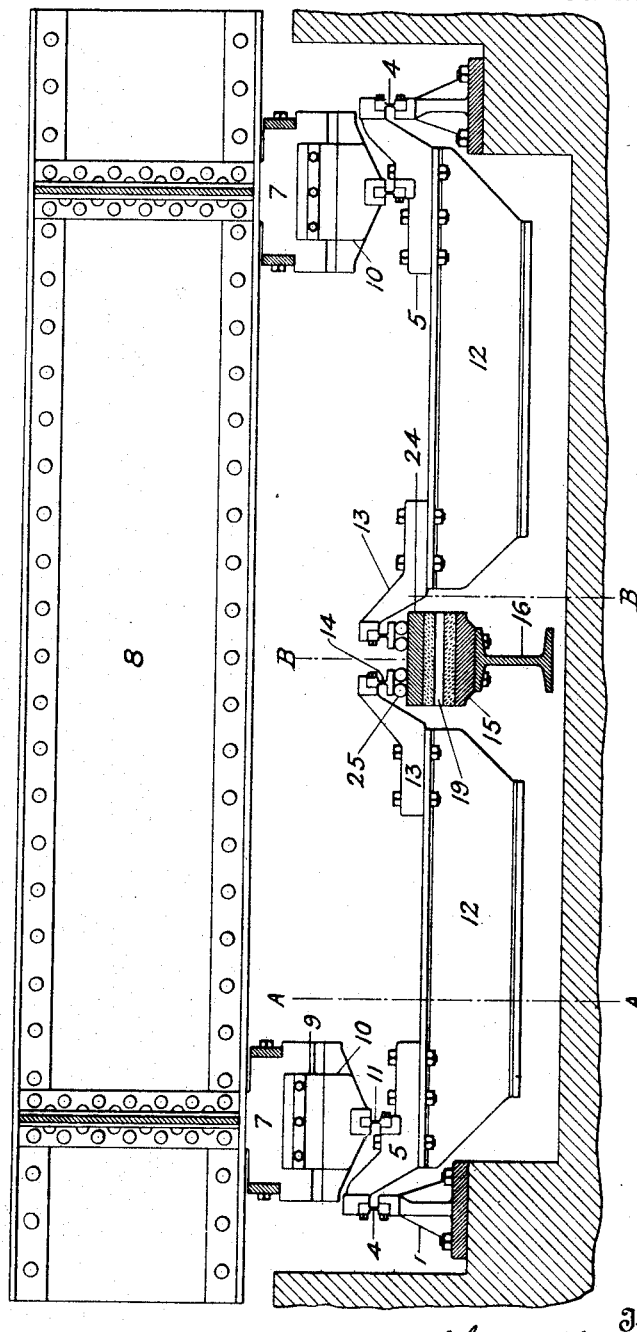
Figure 3:
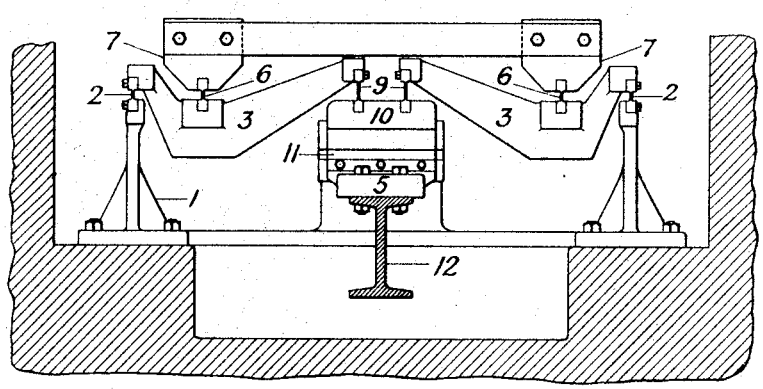
Figure 4:
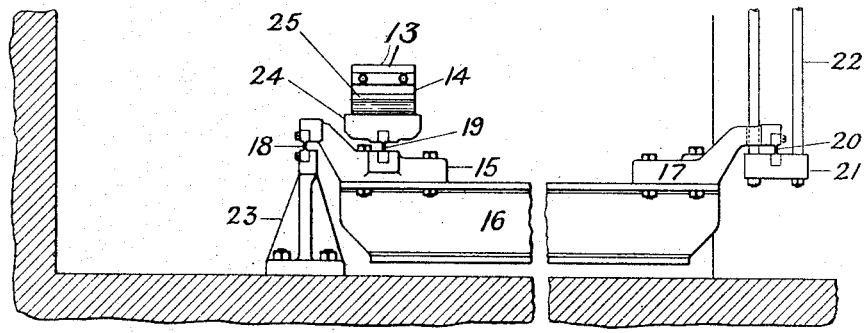

Figure 1 is a plan view showing the lever system of a track scale with the bridge or scale platform removed. Fig. 2 is a longitudinal section of the scale lever system shown in Fig. 1, with the platform therefor. Fig. 3 is a transverse section of the scale taken on the line A—A, Fig. 2, the bridge being omitted. Fig. 4 is a transverse section of the scale taken on the line B—B, Fig. 2, the bridge being omitted.

My invention will be more fully understood from the following detailed description of the drawings, in which the same reference numerals, in the various figures, refer to the same parts.

1 represents two foundation-beds set transversely, one near each end of the scale and bolted to any suitable scale foundation, such as 1ª and each carrying two supporting fulcrums 2 for the first levers 3 and one supporting fulcrum 4 for the end 5 of one of the second or longitudinal extension levers.

Each of the first levers 3 is supported at its fixed end by the fulcrum 2 through which it is secured to its bed 1 and is loaded by fulcrum 6 which is secured to its said lever 3 and to its loading block 7. The bridge or scale platform 8 rests on these four blocks 7. Fulcrums 9 are secured to the transmitting ends of levers 3 and these fulcrums transmit their loads to the loading blocks 10 which have secured to them also the loading fulcrums 11 which load the second levers.

Each of the second levers has a main portion 12 to which the head 5 and the end piece 13 are secured. The end piece 13 carries the transmitting fulcrum 14.

The third or transverse extension lever is shown constructed with an end casting 15, a main part 16 and an end casting 17, the end casting 15 having the fixed fulcrum 18 and the loading fulcrum 19 secured to it, the end casting 17 having the transmitting fulcrum 20 secured to it. The fulcrum 20 is also secured to the yoke bar 21; yoke rods 22 carry the load to a scale beam or other weighing device. The fixed fulcrum 18 is carried by and secured to a pedestal 23. The third lever loading fulcrum 19 carries the loading platform 24. Between the fulcrum 14 and the loading platform 24 are placed rollers 25.

The action of this scale in general is fully described in my application Serial No. 69,665 of even date herewith, but differs in the construction of parts located between the second and third levers.

In use it is found that changes of temperature or of load tend to cause a relative motion between the ends of the second levers and the loading block of the 3rd lever and if there is no provision made to allow therefor, stresses are set up in the lever system which cause incorrect weighings. By placing rollers between the transmitting fulcrums of the second levers and the loading block of the 3rd lever this motion can take place freely without causing any appreciable horizontal stresses in the lever system.

I claim:

1. In a plate-fulcrum scale, a primary lever having a fixed plate-fulcrum, a secondary lever, a loading block therefor, a plate fulcrum securing said block to its lever, a plate fulcrum secured to the transmitting end of said primary lever and a roller bearing between said transmitting fulcrum and said loading block.

2. In a plate-fulcrum scale, a lever, a loading block and a plate-fulcrum therefor, a pair of similar levers transmitting loads to said loading block, transmitting plate-fulcrums secured to said similar levers, and rolling bearings between said loading block and said transmitting plate-fulcrums.

3. In a scale, a lever, a loading block therefor, a plate-fulcrum securing together said lever and loading block, a pair of primary levers, plate-fulcrums secured to said primary levers and rollers between the last named plate-fulcrums and said loading block.

4. In a plate-fulcrum scale, two parallel pairs of first levers which receive their loads from the platform of the scale, two second levers placed at right angles to said first levers, a single third lever at right angles to said second levers, a loading block, a plate-fulcrum securely attached to said loading block and to said third lever, plate-fulcrums secured to the inner ends of said second levers, and rollers between said second lever fulcrums and said loading block.

The foregoing specification signed at Stamford, Conn., this 27th day of December, 1915.

ALBERT HAMILTON EMERY.

Copies of this patent may be obtained for five cents each, by addressing the "Commissioner of Patents, Washington, D C."